United States Patent
Glowacki

(10) Patent No.: US 11,628,813 B1
(45) Date of Patent: Apr. 18, 2023

(54) WALKING TRAILER STAND

(71) Applicant: Grant Glowacki, Niagara Falls (CA)

(72) Inventor: Grant Glowacki, Niagara Falls (CA)

(*) Notice: Subject to any disclaimer, the term of this patent is extended or adjusted under 35 U.S.C. 154(b) by 95 days.

(21) Appl. No.: 17/479,300

(22) Filed: Sep. 20, 2021

(51) Int. Cl.
*B60S 9/18* (2006.01)
*B60D 1/66* (2006.01)

(52) U.S. Cl.
CPC .............. *B60S 9/18* (2013.01); *B60D 1/66* (2013.01); *B60D 1/665* (2013.01)

(58) Field of Classification Search
CPC .............. B60D 1/66; B60D 1/665; B60S 9/18
See application file for complete search history.

(56) References Cited

U.S. PATENT DOCUMENTS

| | | | |
|---|---|---|---|
| 5,340,143 A | 9/1994 | Thomas | |
| 5,527,054 A * | 6/1996 | Williams | B60S 9/08 254/419 |
| 5,690,348 A * | 11/1997 | Williams, Jr. | B60D 1/36 280/475 |
| 5,755,430 A * | 5/1998 | Couch | B60S 9/04 254/420 |
| 7,425,012 B1 * | 9/2008 | Sease | B60P 3/1083 280/475 |
| 7,802,814 B2 * | 9/2010 | Lagsdin | B60S 9/02 280/764.1 |
| 7,954,829 B2 * | 6/2011 | Von Tersch | B60D 1/66 280/475 |
| 8,500,102 B2 * | 8/2013 | Scott | B60S 9/04 280/475 |
| 8,739,941 B2 * | 6/2014 | White | B60P 3/36 248/352 |
| 8,944,455 B2 * | 2/2015 | Lambros | B60S 9/02 280/475 |
| 9,988,021 B1 * | 6/2018 | Young | B60S 9/04 |
| 10,160,424 B2 | 12/2018 | Roberts | |
| 11,400,778 B2 * | 8/2022 | Taylor | B60D 1/66 |
| 2006/0043695 A1 * | 3/2006 | Wilson, Jr. | B60S 9/18 280/475 |
| 2022/0371500 A1 * | 11/2022 | Murrell | B60S 13/00 |

FOREIGN PATENT DOCUMENTS

| | | | |
|---|---|---|---|
| DE | 102017002039 A1 * | 8/2017 | |
| DE | 202021104993 U1 * | 2/2022 | |

* cited by examiner

*Primary Examiner* — Kevin Hurley
(74) *Attorney, Agent, or Firm* — Sanchelima & Associates, P.A.; Christian Sanchelima; Jesus Sanchelima

(57) ABSTRACT

A walking trailer stand including a mobile trailer assembly, a trailer stand assembly, and a reversible feet assembly is disclosed. These assemblies allow for the manually powered movement of a mobile trailer. The trailer stand assembly including a leg holder to receive a bottom end of a trailer A-frame. The leg holder being mounted to either side of a base via a bracket. The base including a jack guide extending from a base top end and an internally mounted jack holder. Wherein the jack guide and jack holder receive a jack member therein to form a fulcrum to allow a user to lift and drop the trailer A-frame. The reversible feet assembly including reversible feet that include a rubberized portion and an oppositely arranged cleated portion. The reversible feet are mounted to an underside of the base so the trailer may be walked with the actuation of the jack member.

14 Claims, 4 Drawing Sheets

WALKING TRAILER STAND

BACKGROUND OF THE INVENTION

1. Field of the Invention

The present invention relates to a walking trailer stand and, more particularly, to a walking trailer stand that includes a central jack holder and a base member with two circular feet.

2. Description of the Related Art

Several designs for a walking trailer stand have been designed in the past. None of them, however, include two circular feet pivotally attached to a base member wherein the base member receives a rod for applying pressure to said base member and thereby walking the two circular feet of the device.

Applicant believes that a related reference corresponds to U.S. Pat. No. 5,340,143 issued for a slidable support assembly which is affixed to an extensible jack leg of a trailer. Applicant believes that another related reference corresponds to U.S. Pat. No. 10,160,424 issued for a translationally maneuverable trailer jack track system. None of these references, however, teach of a walking trailer stand that includes a jack member to manually actuate the walkable feet of the device.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a walking trailer stand that includes two circular feet attached to a base member.

It is another object of this invention to provide a walking trailer stand that includes a base member that receives a jack member to manually actuate the feet of the device.

It is still another object of the present invention to provide a walking trailer stand that includes two circular feet that are reversible to facilitate walking the device over various surfaces.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
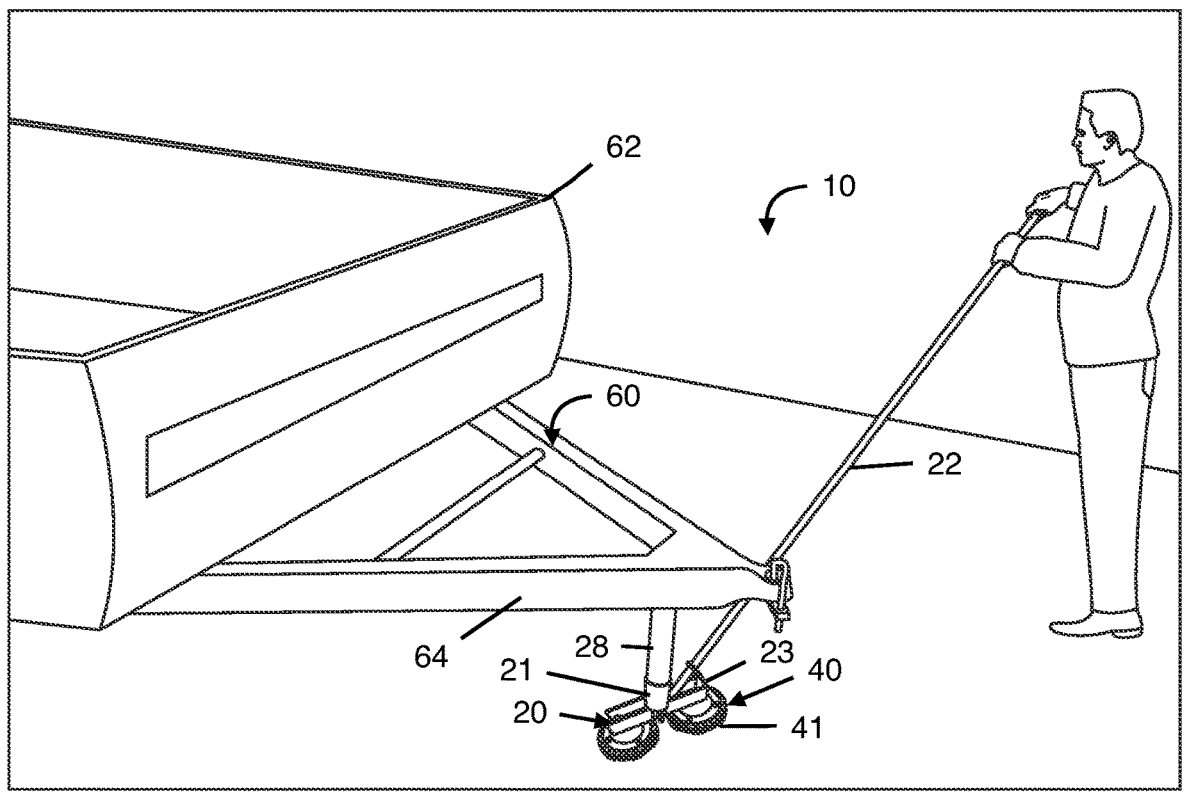
FIG. 1 represents an operational view of a user actuating a jack member 22 of the trailer stand assembly 20. The base 23 receives the jack member 22 therein to form a fulcrum which allows the user to lift the trailer 62 and pivot the base 23 that is mounted to an underside of a trailer A-frame 64 via the jack leg 28. The base 23 includes reversible feet 41 of the reversible feet assembly 40 that can be positioned as the base 23 is maneuvered to relocate the trailer 62 into a user's desired position.

Referring now to the drawings, where the present invention is generally referred to with numeral 10, it can be observed that it basically includes a trailer stand assembly 20, a reversible feet assembly 40, and a trailer assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
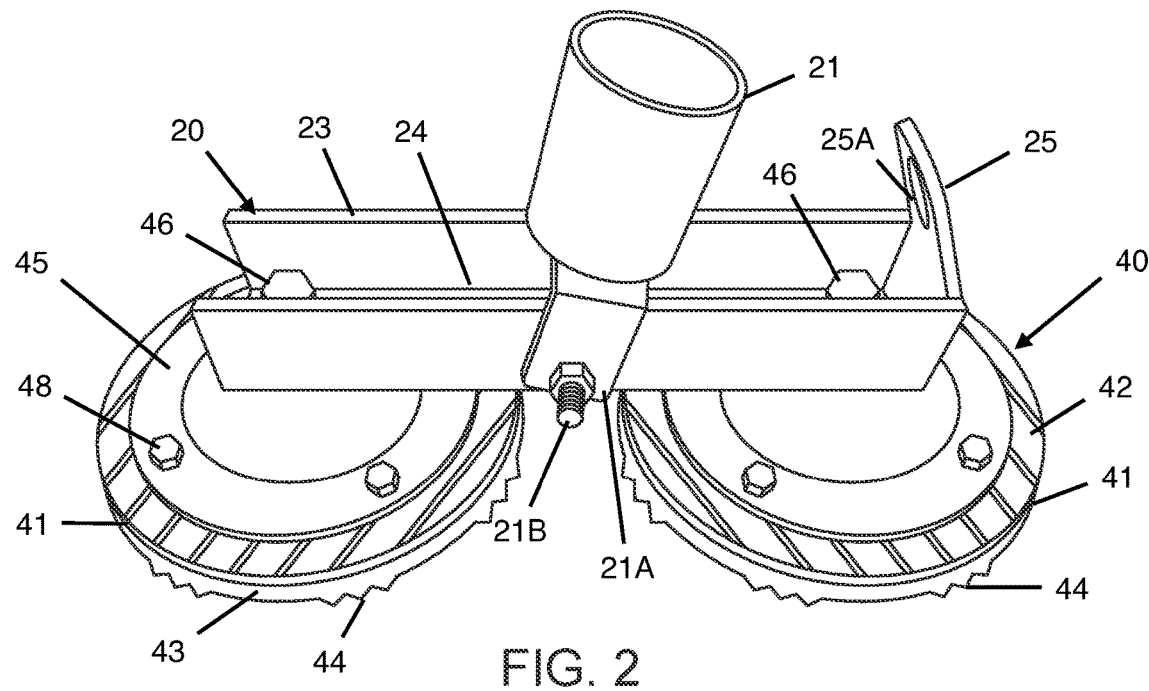
FIG. 2 shows a front view of the reversible feet assembly 40 in one possible configuration or a cleated configuration. The reversible feet assembly 40 including reversible feet 41 mounted to the base 23 with a cleated portion 43 in a downward position. The presented configuration may help maneuver the reversible feet assembly 40 on uneven or loose ground surfaces.
Figure 4:
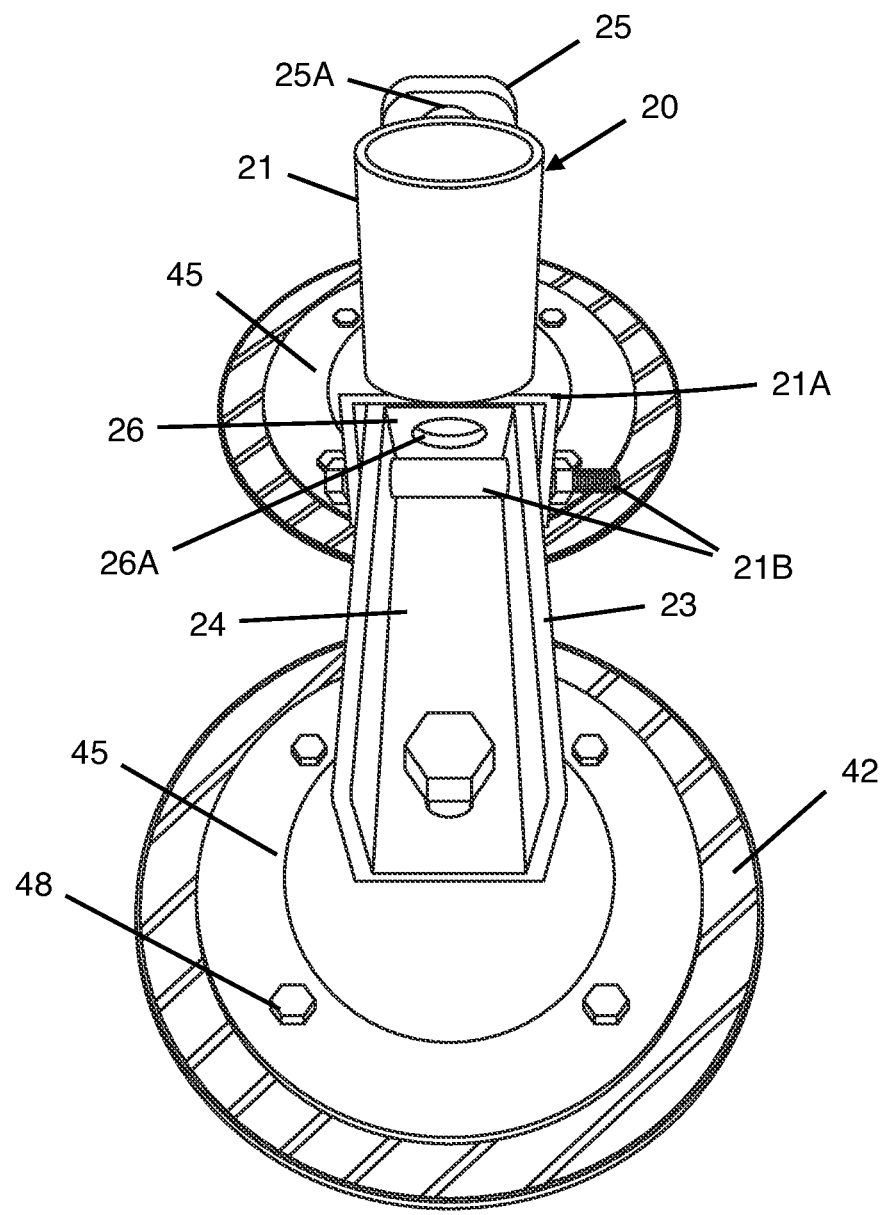
FIG. 4 is a representation of side view of the base 23 of the trailer stand assembly 20. The base 23 including a channel 24 longitudinally disposed about an interior portion of said base 23. The base includes a leg holder 21 mounted thereon via a swivel fastener 21B that traverses the channel 24 laterally. The channel 24 includes a jack holder 26 mounted therein. The jack holder 26 includes an opening that is in alignment with an opening of the jack guide 25.

Best illustrated in FIGS. 1 and 4 the trailer stand assembly 20 may include a jack member 22. The jack member 22 may be an elongated pole or rod and made of a rigid material such as steel, iron, or aluminum. The jack member 22 may be received within base 23. Referring now to FIG. 2, the base 23 may have a rectangular shape with an open top portion and a longitudinal channel disposed therein. Located at a first end of the base 23 may be a jack guide 25. The jack guide 25 may be a flattened protrusion that extends upward from a top edge of the base 23. The jack guide 25 may include a jack guide aperture 25A configured to receive the jack member 22 therein. It may be suitable for the jack guide 25 to be angled toward the top end of the base 23

Best shown in FIG. 4 located within the interior of the base 23 may be a jack anchor 26. The jack anchor 26 may be a flattened member that extends upward from the bottom of the base 23. The jack anchor 26 may include a jack anchor aperture 26A. Wherein the jack anchor aperture 26A of the jack anchor 26 is in alignment with the aperture of the jack guide 25. In one embodiment each of said jack guide aperture 25A and the jack anchor aperture 26A have a circular shape. While in operation, the jack member 22 may traverse the jack guide aperture 25A from a top end to be anchored by the jack anchor 26. It may be suitable for the jack anchor 26 to serve as a fulcrum point for a user to lift and drop the jack member 22 and by extension the trailer 62.

As depicted in FIGS. 1 and 4 a leg holder 21 may be a hollow cylindrical member configured to receive a jack leg 28 located at a bottom end of a trailer A-frame 64. The leg holder 21 may include a leg holder base 21A. The leg holder base 21A may be a flattened U-shaped member mounted to a bottom end of the leg holder 21. In one embodiment the leg holder base 21A may be mounted in alignment directly above the jack anchor 26. As shown in FIG. 4, the leg holder base 21A may be secured about the exterior lateral side walls of the base 23 via swivel fastener 21B. The swivel fastener 21B may be a bolt that traverses the leg holder base 21A and the interior of the base 23 to secure the leg holder 21 thereon. The swivel fastener 21B may allow for the base 23 to pivot up and down as the user actuates the jack member 22. It may be suitable for the base 23 interior to include securing plate fasteners 46 disposed on opposing bottom ends of said base 23. The securing plate fasteners 46 may traverse a bottom wall of the base 23 to secure the reversible feet assembly 40 thereon.

Figure 3:
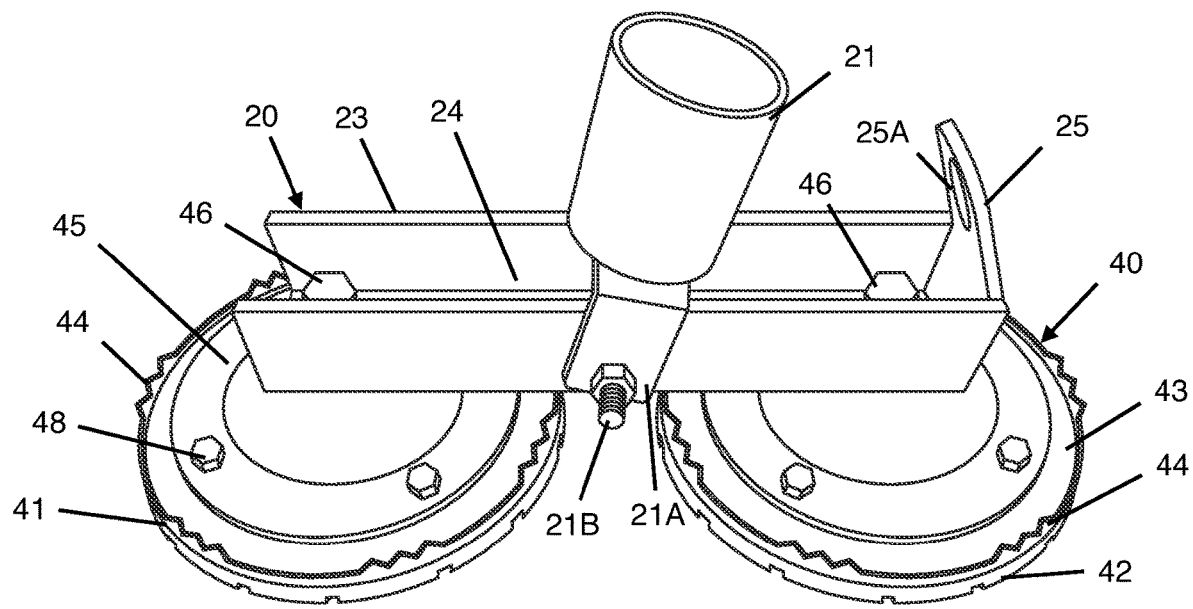
FIG. 3 illustrates a front view of the reversible feet assembly 40 in an alternate configuration or a rubber configuration. The reversible feet 41 of the reversible feet assembly 40 are mounted to the base 23 with the rubberized portion 42 in a downward position. This presented configuration may help maneuver the reversible feet assembly 40 on smoother surfaces and prevent slipping.

As demonstrated in FIGS. 2 and 3 the reversible feet assembly 40 may include securing plate 45. The securing plates 45 may include a half dome shape with a flattened protrusion perpendicularly extending about the circumference of the securing plate 45 edge. The securing plates 45 may be secured to the opposing bottom ends of the base 23 via the securing plate fasteners 46. It may be suitable for the securing plates 45 to be mounted to the base 23 with the convex portion of the half dome shape oriented towards the bottom of the base 23. The securing plates 45 may include feet fasteners 48. The feet fasteners 48 may be threaded members that engage with the reversible feet 41. The reversible feet 41 may be circular members that include two facets. A first facet includes a rubberized portion 42 and a second facet includes a cleated portion 43. Wherein the feet fasteners 48 may allow for the reversible feet 41 to be mounted to the bottom end of the securing plates 45 in multiple configurations. The reversible feet 41 may include two configurations.

As shown in FIG. 2 the reversible feet 41 may include a cleated configuration. The cleated configuration includes the cleated portion 43 facing downward with respect to the base 23. The cleated portion 43 may be a flat surface with a circular shape. Extending perpendicularly with respect to the edge of the cleated portion 43 may be cleats 44. The cleats 44 include a series of flattened triangular members that are circumferentially mounted about the edge of the cleated portion 43. While in the cleated configuration the cleats 44 of the cleated portion 43 engage with a floor surface and are able to grip on to loose ground more securely to support the weight of the trailer A-frame 64 thereon.

As shown in FIG. 3 the reversible feet 41 may include a rubber configuration. The rubber configuration includes the rubberized portion 42 facing downward with respect to the base 23. The rubberized portion 42 may be a rubber member that includes a tread disposed about the surface of said rubberized portion 42. The treading of the rubberized portion 42 may help provide better traction to move the reversible feet assembly 40 as it makes contact with the ground. It may be suitable to use the rubberized portion 42 to be used in scenarios with smoother or slippery surfaces.

Figure 5:
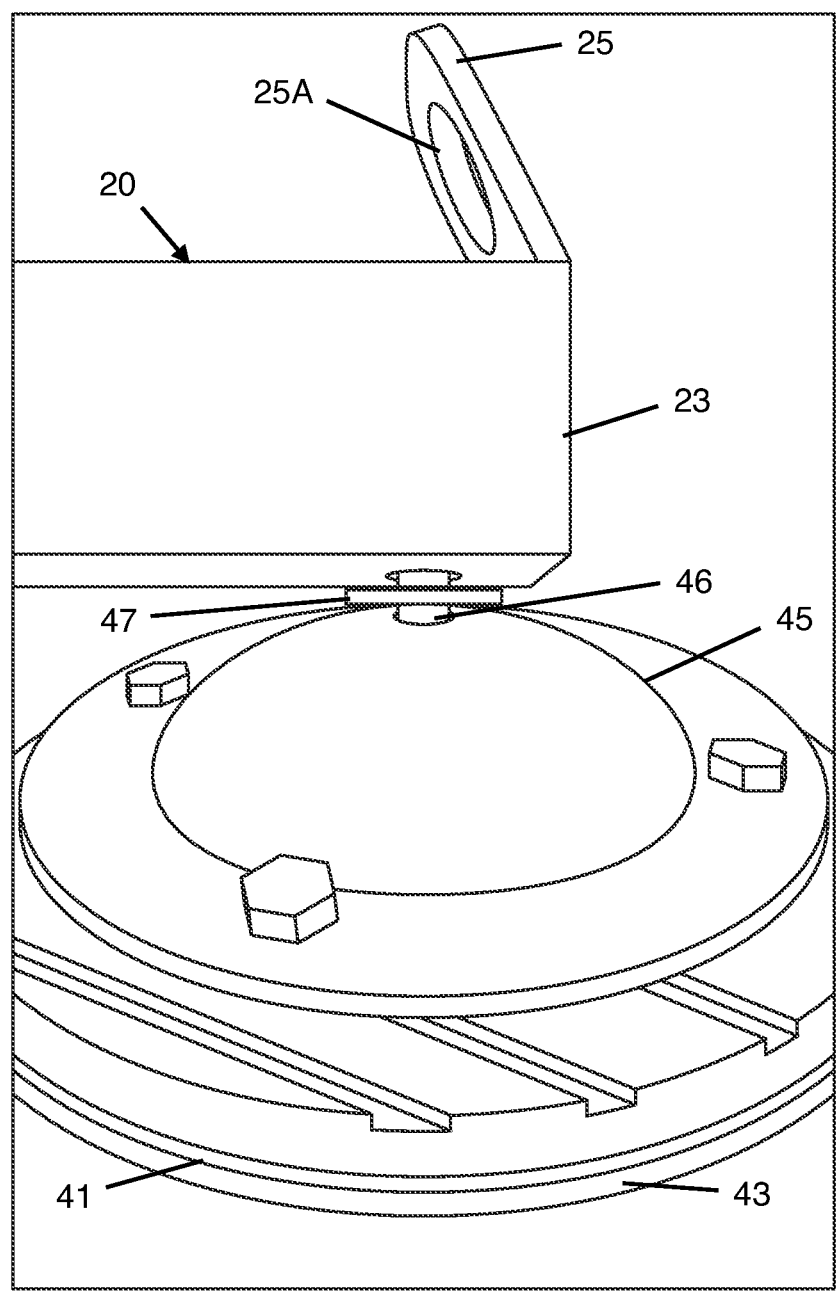
FIG. 5 depicts an enlarged side view of the reversible feet 41 of reversible feet assembly 40. The reversible feet 41 is fastened to the securing plate 45 and includes the cleated portion 43 in a downward position. The securing plate fastener 46 traverses a bottom end of the base 23 to mount the securing plate 45 thereon. The semi-domed top portion of the securing plate 45 allows for the reversible feet 41 to pivot at various angles while in use to walk across a variety of surfaces. Located between the base 23 and the securing plate 45 may be support washer 47. The support washer 47 allows for a smoother walking motion of the reversible feet 41 while the present invention is in operation.

Best depicted in FIG. 5 located between the bottom of the base 23 and the top end of the securing plate 45 may be a support washer 47. The support washer 47 may help prevent friction from damaging the bottom of the base 23 and the top end of the securing plate 45. In ideal operating conditions a trailer assembly 60 including a trailer A-frame 64 may be engaged with the leg holder 21. A user may then engage the jack member 22 within the base 23. As the user pivots the jack member 22 about the fulcrum point formed by the jack anchor 26 the user is able to maneuver the trailer A-frame 64 and by extension the trailer 62. The reversible feet assembly 40 mounted to the bottom of the base 23 allow a user to select a configuration depending on the surface finish they are maneuvering their trailer 62 on. For loose ground surfaces, the user may choose to fasten the reversible feet 41 with the cleated portion 43 oriented downward. For smoother or slippery surfaces, a user may choose to fasten the reversible feet 41 with the rubberized portion 42 oriented downward. As the user actuates the jack member 22 one of the reversible feet 41 remains in contact with a given surface while the second of the reversible feet 41 can be lifted and repositioned. Thereby allowing for manual maneuverability of a trailer 62 where machinery may not be capable of reaching or afforded.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A system for a walking trailer stand, comprising:
   a. a mobile trailer assembly including a trailer having a trailer A-frame;
   b. a trailer stand assembly including a leg holder to receive a bottom end of said trailer A-frame, wherein said leg holder includes a leg holder base, the leg holder base being a U-shaped bracket that is secured to lateral sides of a base via a swivel fastener, the base further including a jack guide extending from a base top end and an internally mounted jack holder, wherein the jack guide and jack holder receive a jack member simultaneously therein to form a fulcrum configured for a user to lift and drop the trailer A-frame; and
   c. a reversible feet assembly including reversible feet, wherein said reversible feet include two facets with a rubberized portion and an oppositely arranged cleated portion, wherein the cleated portion includes cleats extending therefrom, the reversible feet being mounted to securing plates via feet fasteners, the securing plates each including a securing plate fastener to mount a securing plate top portion to opposing ends of a base bottom, said securing plate further includes feet fasteners to mount the reversible feet to a securing plate bottom portion, wherein the securing plate fastener thereby allows the reversible feet to be lifted and rotate with said base as the jack member is lifted.
2. The system for a walking trailer stand of claim 1 wherein said rubberized portion includes a treaded surface.
3. The system for a walking trailer stand of claim 1 wherein said cleats are circumferentially disposed about a cleated portion edge.

4. The system for a walking trailer stand of claim 1 wherein said cleats are a series of flattened triangular members.

5. The system for a walking trailer stand of claim 1 wherein said securing plates have a half dome shape, said half dome shape including a convex portion that is oriented towards the base bottom.

6. The system for a walking trailer stand of claim 5 wherein said half dome shape of the securing plates includes a flattened portion extending perpendicularly outward about the edge of said securing plates.

7. The system for a walking trailer stand of claim 1 wherein said leg holder is a hollow cylindrical member.

8. The system for a walking trailer stand of claim 1 wherein said base has a rectangular shape with an open top portion and a longitudinal channel disposed therein.

9. The system for a walking trailer stand of claim 1 wherein said jack guide and jack holder each includes a circular aperture.

10. The system for a walking trailer stand of claim 9 wherein said circular aperture of the jack guide and the jack holder are in alignment to allow for the jack member to traverse said jack guide and said jack holder.

11. The system for a walking trailer stand of claim 1 wherein said reversible feet have a circular shape.

12. The system for a walking trailer stand of claim 1 wherein said securing plate fastener includes a support washer located between the base bottom and the top of the securing plate.

13. A system for a walking trailer stand, comprising:
a. a mobile trailer assembly including a trailer having a trailer A-frame;
b. a trailer stand assembly including a leg holder to receive a bottom end of said trailer A-frame, wherein said leg holder is a hollow cylindrical member and includes a leg holder base, the leg holder base being a U-shaped bracket that is secured to lateral sides of a base via a swivel fastener, the base further including a jack guide extending from a base top end and an internally mounted jack holder, wherein the jack guide and jack holder receive a jack member simultaneously therein to form a fulcrum configured for a user to lift and drop the trailer A-frame; and
c. a reversible feet assembly including reversible feet, wherein said reversible feet have a circular shape and include two facets with a rubberized portion and an oppositely arranged cleated portion, wherein the cleated portion includes cleats extending therefrom, the reversible feet being mounted to securing plates via feet fasteners, the securing plates each having a half dome shape and include a securing plate fastener to mount a securing plate top portion to opposing ends of a base bottom, said securing plate further includes feet fasteners to mount the reversible feet to a securing plate bottom portion, wherein the securing plate fastener thereby allows the reversible feet to be lifted and rotate with said base as the jack member is lifted.

14. A system for a walking trailer stand, consisting of:
a. a mobile trailer assembly including a trailer having a trailer A-frame;
b. a trailer stand assembly including a A-frame holder to receive a bottom end of said trailer A-frame, wherein said leg holder is a hollow cylindrical member and includes a leg holder base, the leg holder base being a U-shaped bracket that is secured to lateral sides of a base via a swivel fastener, the base having a rectangular shape with an open base top portion and a longitudinal channel disposed therein, the base further including a jack guide extending from a base top end and an internally mounted jack holder, wherein the jack guide and jack holder each include a circular aperture arranged in alignment to receive a jack member simultaneously therein and form a fulcrum configured for a user to lift and drop the trailer A-frame; and
c. a reversible feet assembly including reversible feet, wherein said reversible feet have a circular shape and include two facets with a rubberized portion and an oppositely arranged cleated portion, wherein the rubberized portion includes a rubber member having a treaded surface, the cleated portion includes cleats circumferentially disposed about a cleated portion edge, wherein the cleats are a series of flattened triangular members, the reversible feet being mounted to securing plates via feet fasteners, the securing plates each having a half dome shape and include a securing plate fastener to mount securing plates top portion to opposing ends of a base bottom, the half dome shape of the securing plates including a convex portion that is oriented towards the base bottom, the securing plate fastener including a support washer located entirely between the base bottom and the securing plate top portion, said securing plates further includes a flattened portion extending perpendicularly outward about the edge of the securing plates, the securing plates including feet fasteners to mount the reversible feet to a securing plate bottom portion, wherein the securing plate fastener thereby allows the reversible feet to be lifted and rotate with said base as the jack member is lifted.

* * * * *